J. B. ALLEN.
LINOTYPE MACHINE.
APPLICATION FILED OCT. 5, 1906.
956,790.
Patented May 3, 1910.
12 SHEETS—SHEET 10.
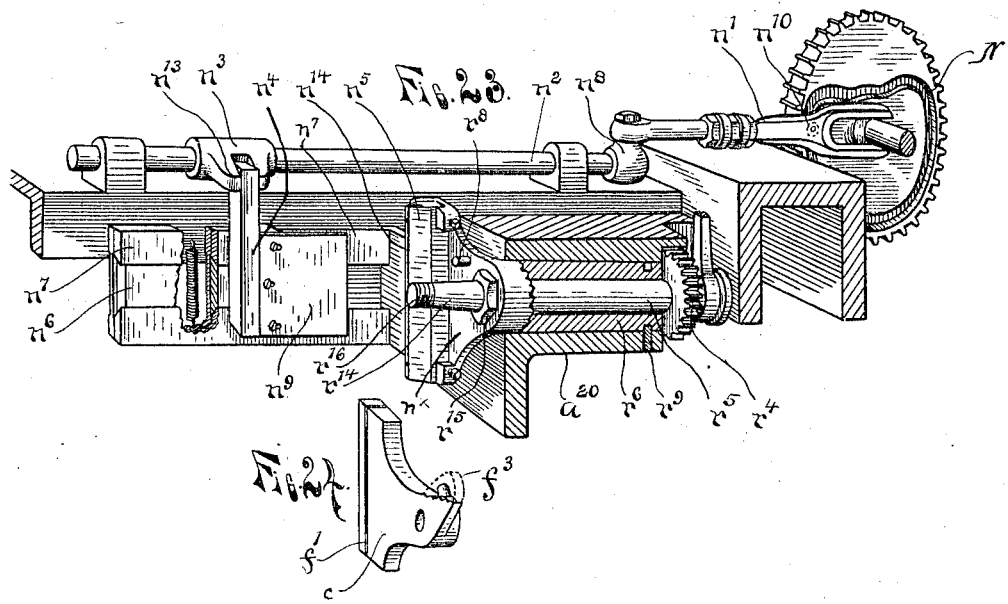
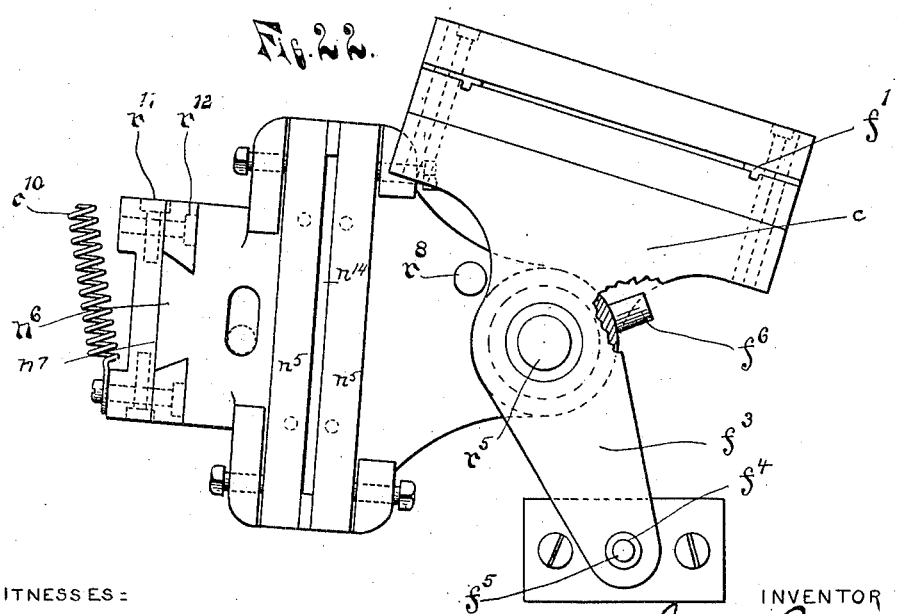
WITNESSES:
INVENTOR J. B. ALLEN.
LINOTYPE MACHINE.
APPLICATION FILED OCT. 5, 1906.
956,790.
Patented May 3, 1910.
12 SHEETS—SHEET 11.
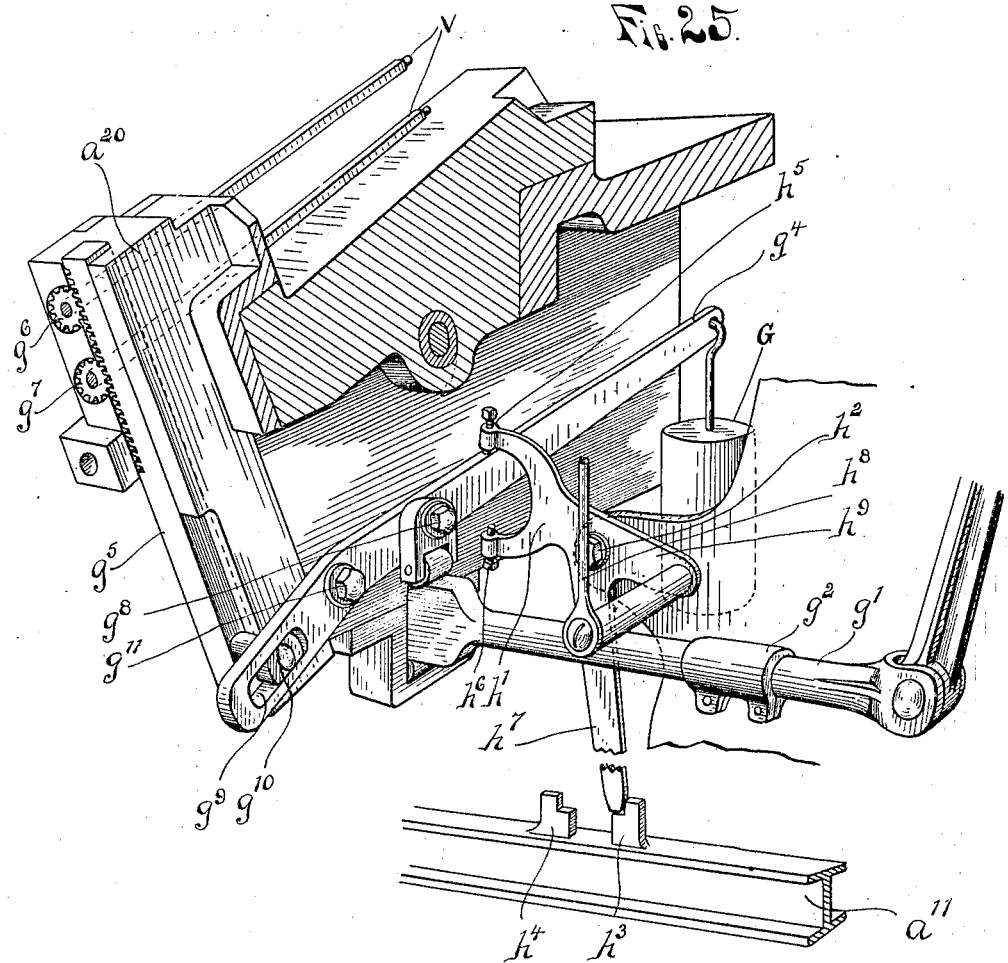

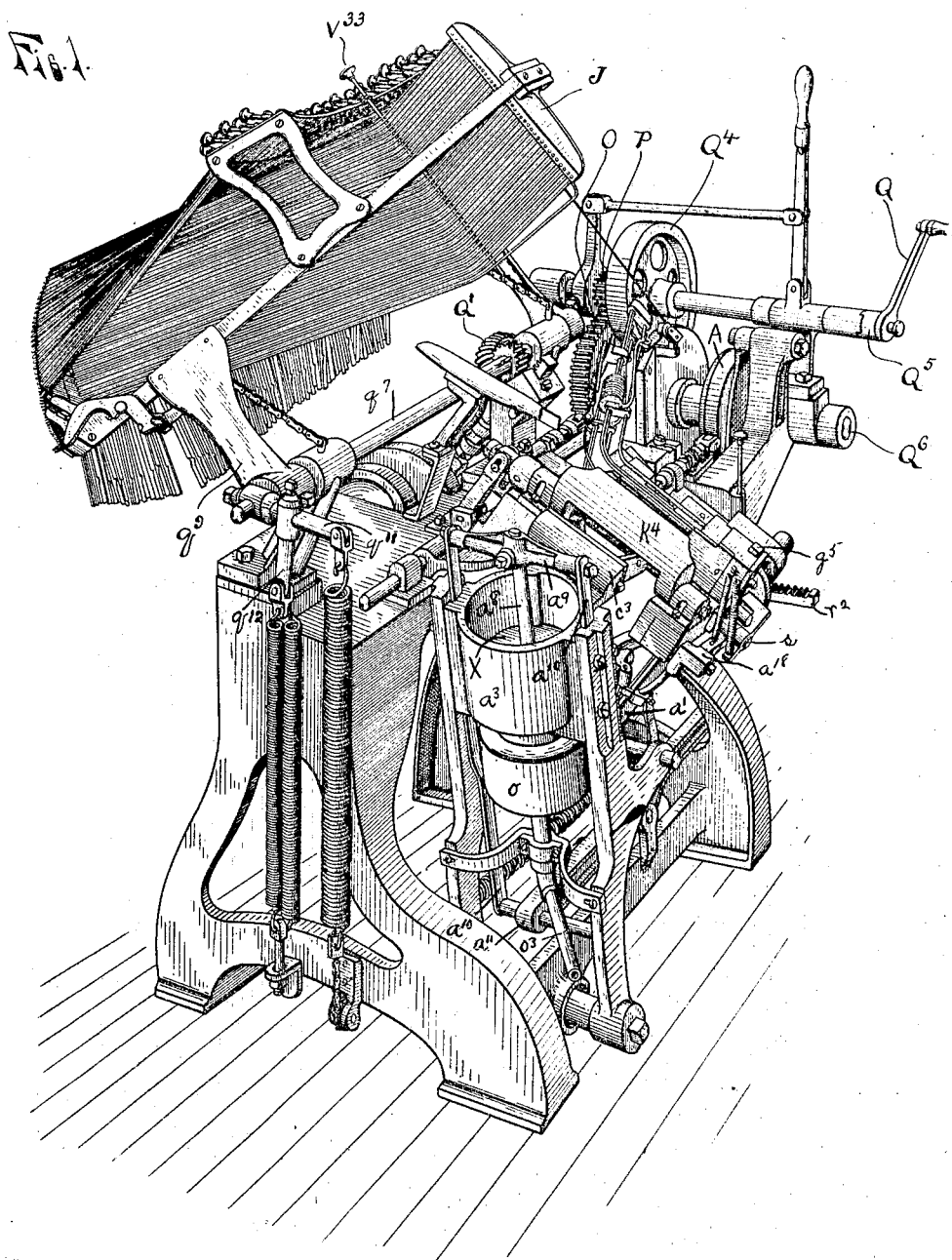

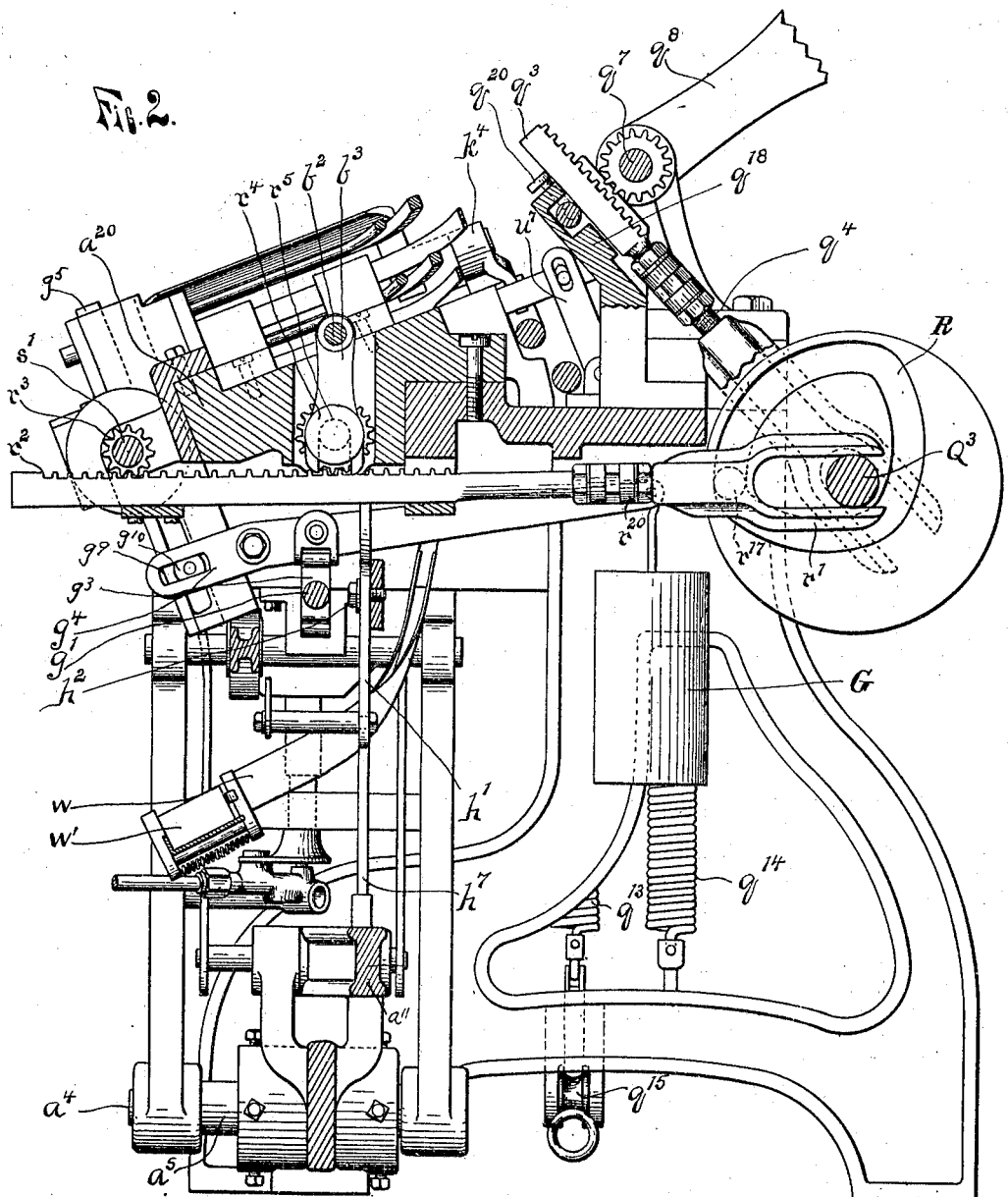

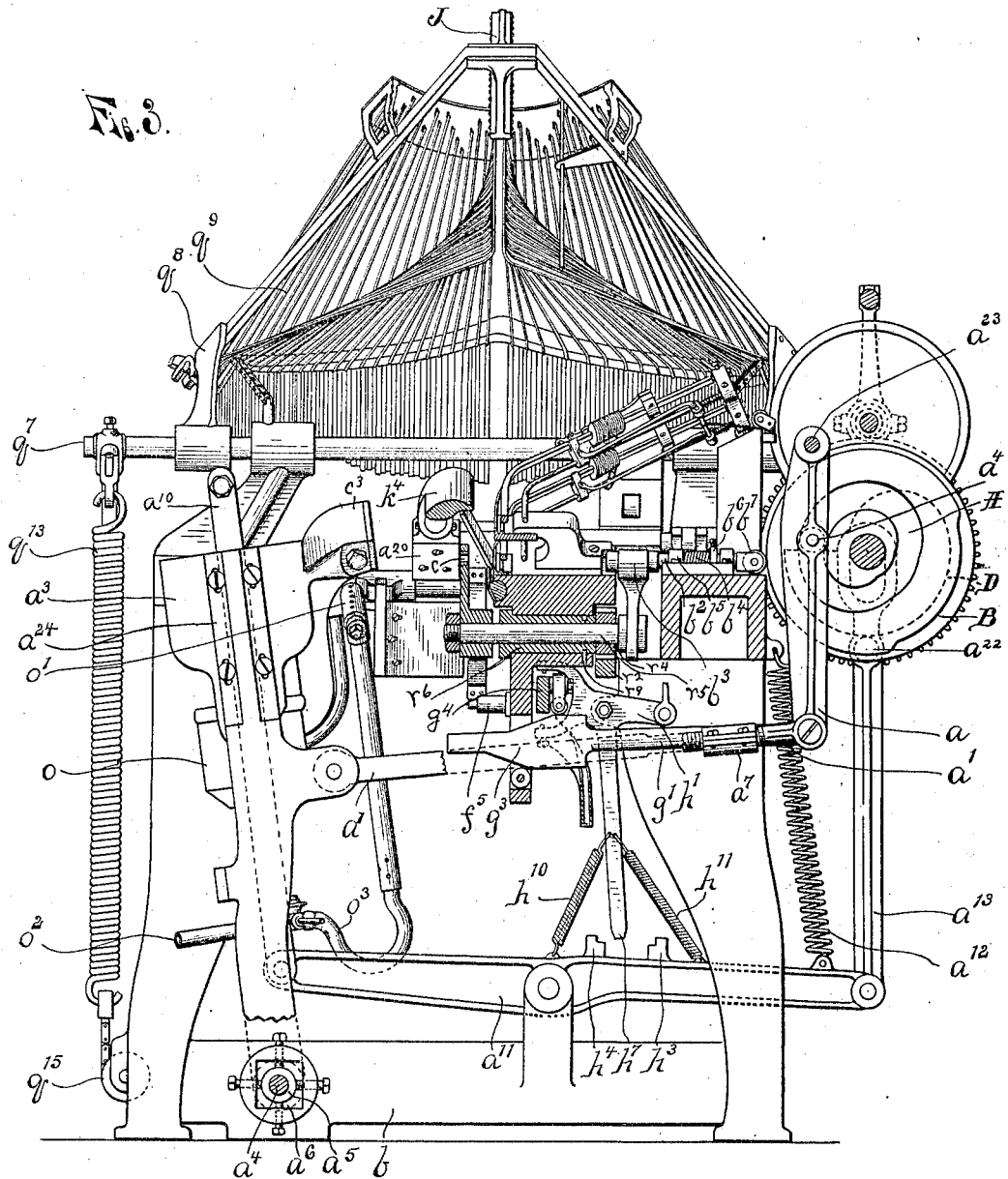

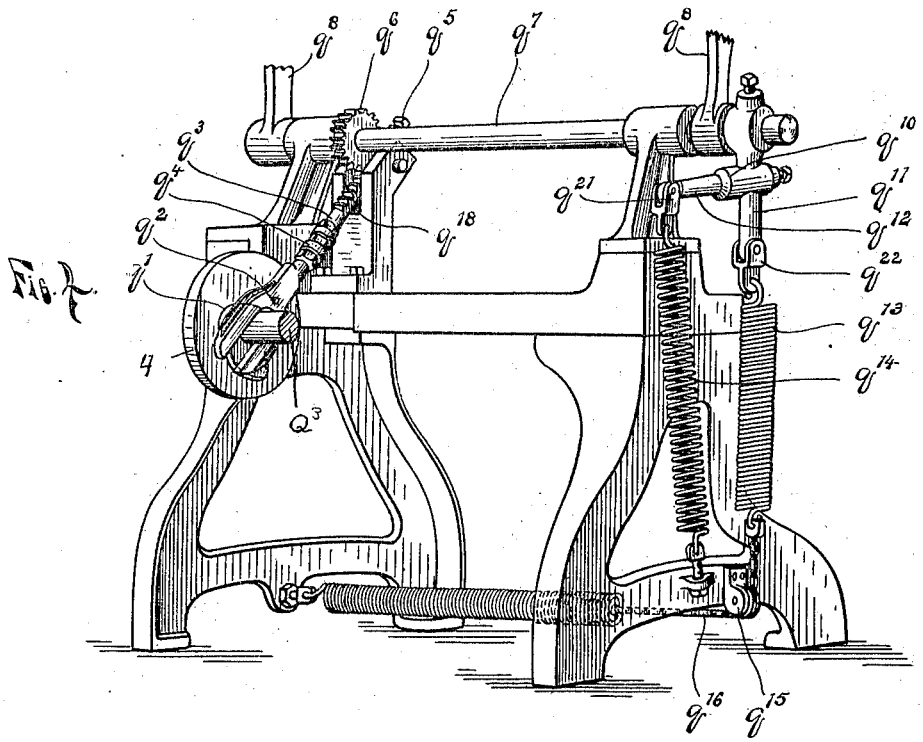
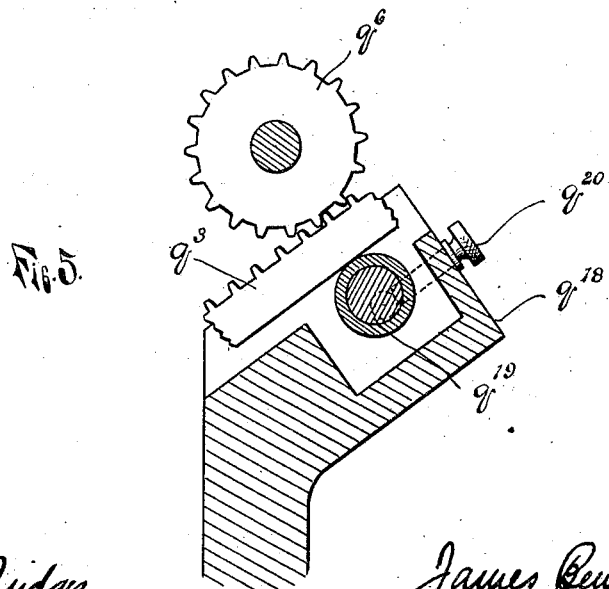

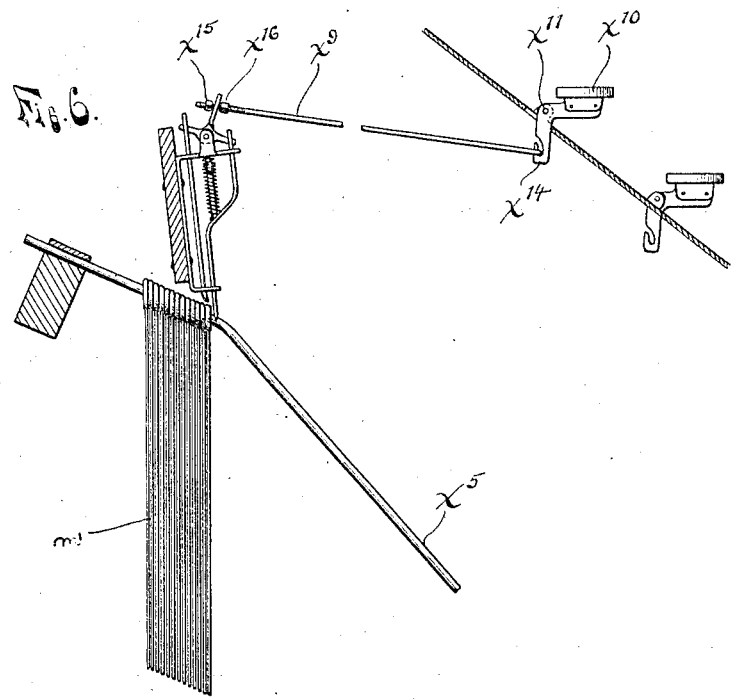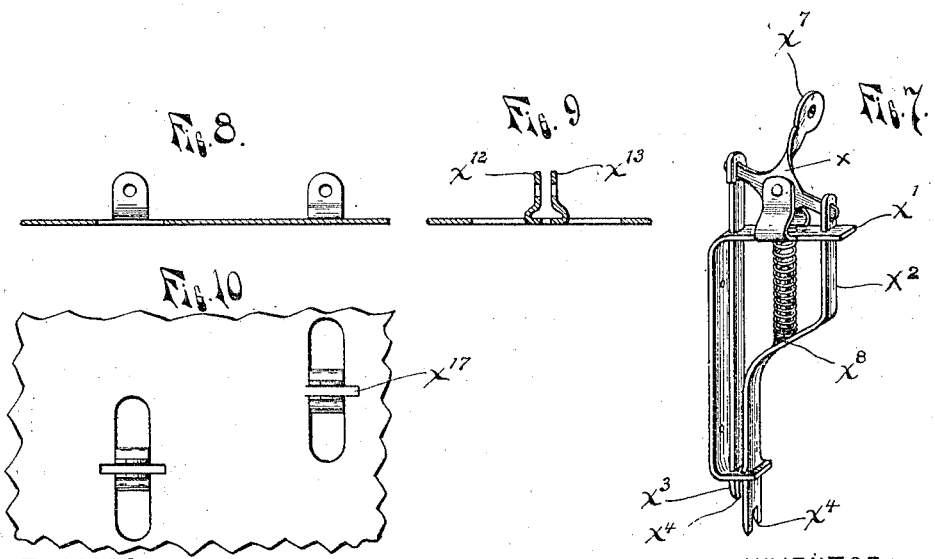

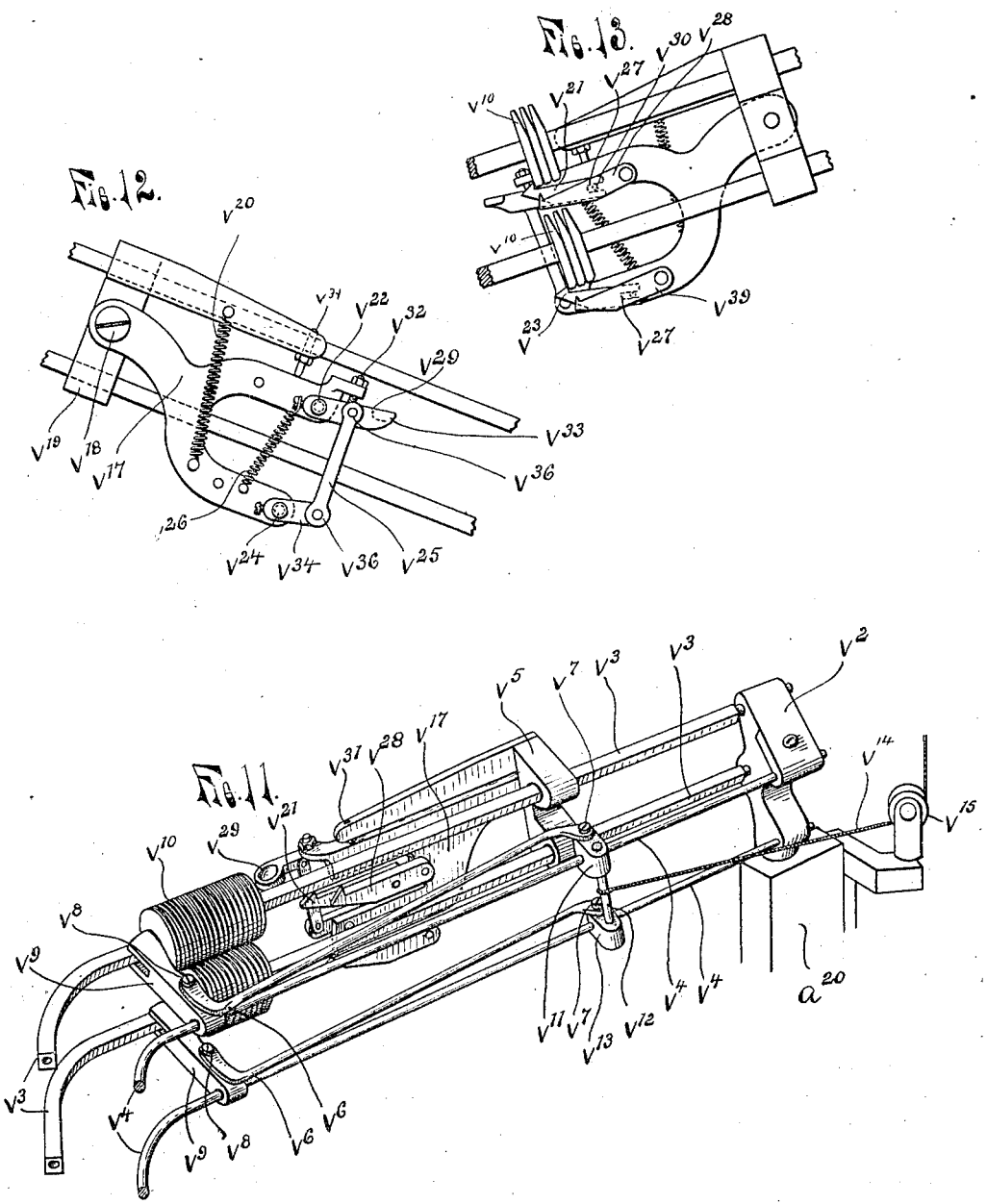

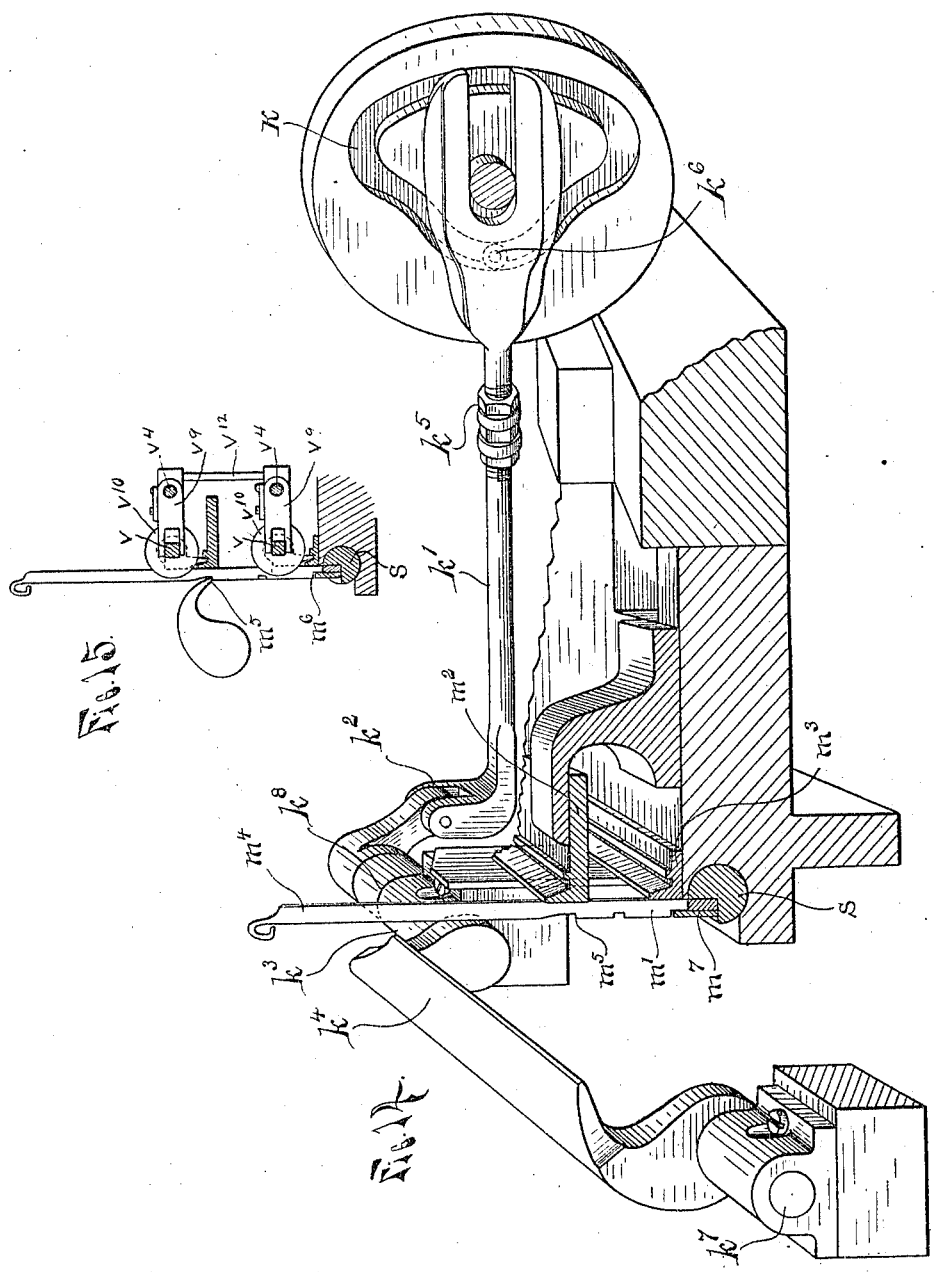

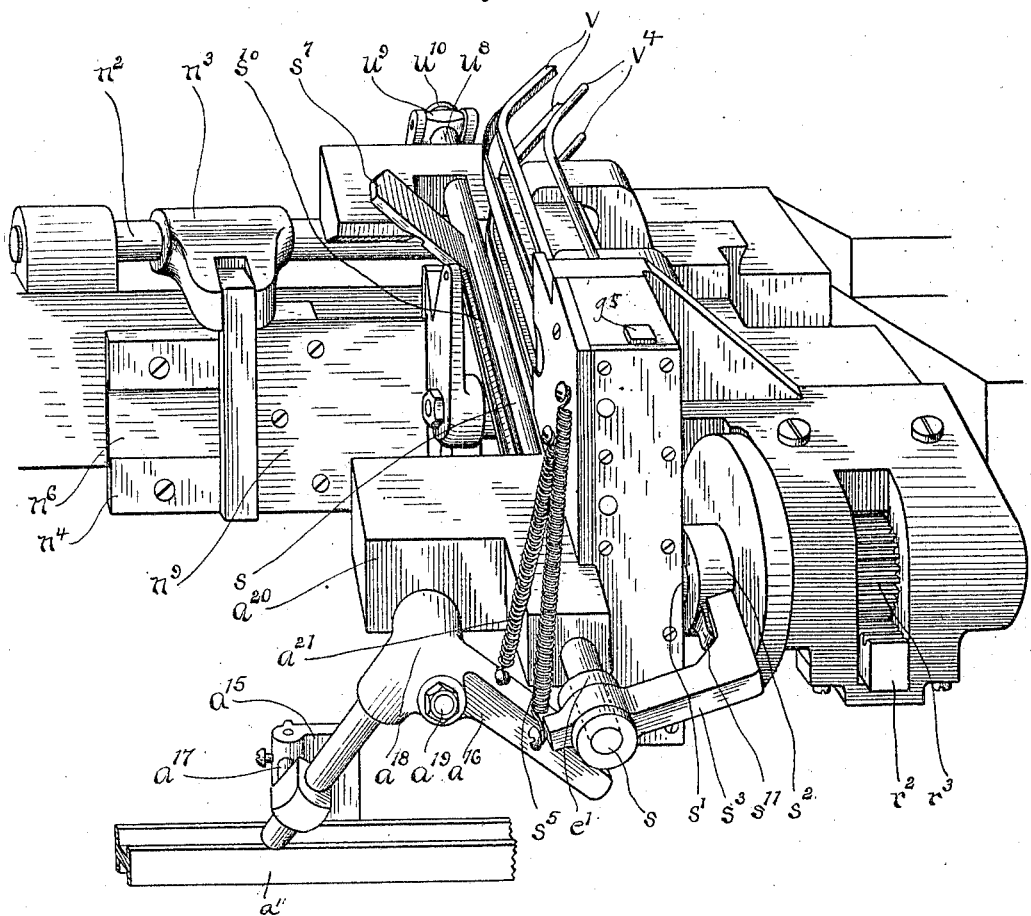

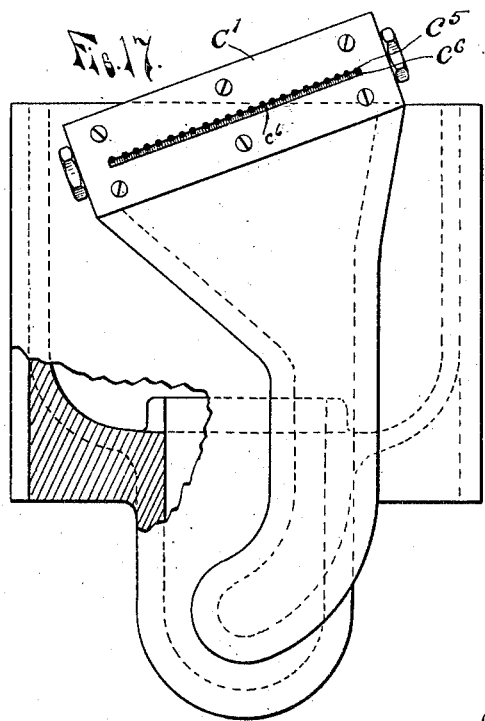
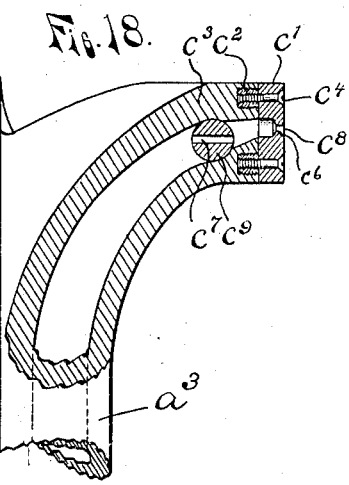
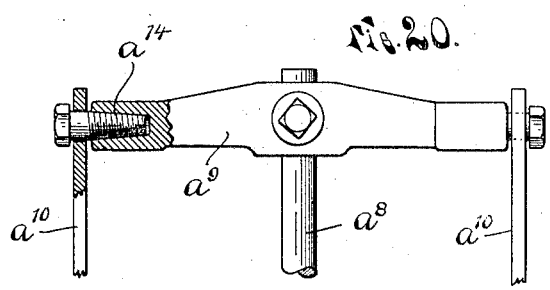
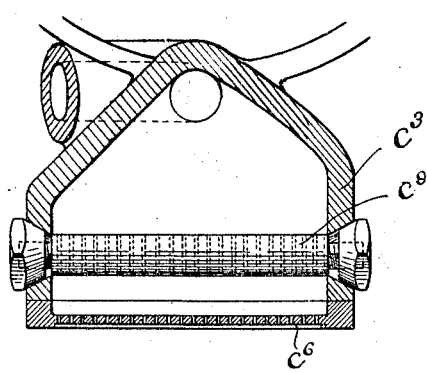
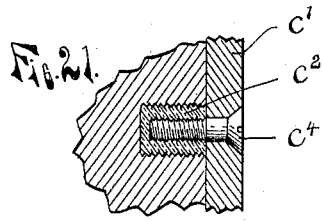

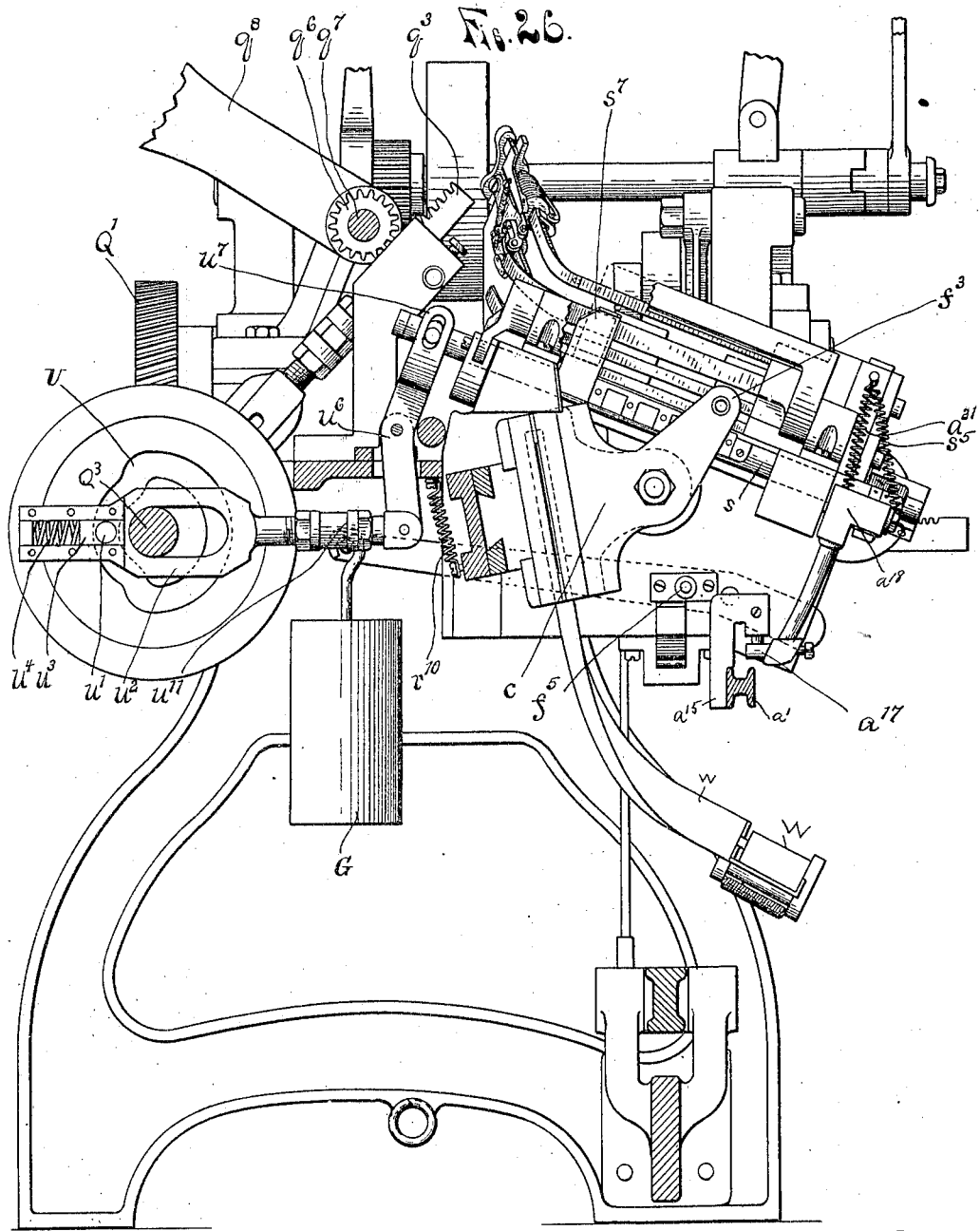

UNITED STATES PATENT OFFICE.

JAMES BENJAMIN ALLEN, OF DETROIT, MICHIGAN.

LINOTYPE-MACHINE.

956,790.   Specification of Letters Patent.   Patented May 3, 1910.

Application filed October 5, 1906. Serial No. 337,618.

*To all whom it may concern:*

Be it known that I, JAMES BENJAMIN ALLEN, a citizen of the United States, and resident of the city of Detroit, in the county of Wayne and State of Michigan, have invented certain new and useful Improvements in Linotype-Machines, of which the following is a specification.

My invention has reference more particularly to the class of machine originally known as the "typograph," wherein matrices are suspended from a guide or guides which latter converge toward a certain direction, so that at a certain time in the operation of the machine the matrices are assembled in line and are redistributed after use by motion along the guides aforesaid in their diverging directions.

My invention includes, among other features, improvements in the method of operating the casting box so as to allow of the production of a large line; improved means of adjusting the melting pot; improved means of preventing casting in case of the setting of too long a line and the method of locking the compressor bar in position; improved melting pot nipple; improved methods of operating on the spacers; means of operating the swinging of the top automatically; improved methods of preventing injury to the machine in case of a tight line; improved spacer distributer; improved method of making the key-board; improved matrix escapement and improved arrangements for the coöperation of the various parts.

The annexed drawings and the following description set forth one mechanical form of the invention in its various parts illustrating the parts thereof.

Referring to the drawings: Fig. 1. is a perspective view of the improved machine from the left hand front, with the top thrown back. Fig. 2. is a vertical section of the machine from front to rear through the casting box rack bar. Fig. 3. is a view of the machine from the front with a portion broken away to expose the interior of the casting box operating mechanism, etc. Fig. 4. is a detailed view showing the rack bar operating the automatic top. Fig. 5. shows means of throwing rack bar into and out of engagement. Fig. 6. is a detail of the matrix escapement. Fig. 7. is a perspective view of the same. Figs. 8, 9 and 10. show details of the method of making parts of the key board. Figs. 11 and 12. show details of the spacer distributer. Fig. 13. is a perspective view of the same. Figs. 14 and 15. is a detail showing method of operation of the liner bar, etc. Fig. 16. is a top view showing the operation of the compressor bar and details of surrounding parts. Figs. 17, 18, 19, 20 and 21. are details of the melting pot nipple, crosshead, and the means of adjustment of same. Fig. 22. is a detail of the casting box and ejector bracket. Figs. 23 and 24. detail showing method of operation of the ejector bracket and casting box shaft. Fig. 25. shows method of operation of the spacer shaft and anti splash levers. Fig. 26. shows a vertical section of the machine from front to rear through the lower part of the spacer shaft.

The machine to which the improvements are shown as applicable is one of the class of linotype machines known as the typograph in which character or matrix bars $m'$ are suspended upon ways or way wires $x^5$ attached to what is generally known as the top, this top being pivoted on the frame and allowing reciprocating motion for the purpose of assembling and re-distributing the character bars; when the top is swung forward the wires are inclined from rear to front downward so that the matrix bars may descend by gravity, while when the top is thrown back the way wires incline from front to rear downward so that the matrix bars may be re-distributed by gravity; there is attached to each way wire an escapement $x$ and the escapements are operated by finger keys $x^{10}$. All the above form parts of the top. The spaces consist of a wedge plate and wing $v^{10}$ both of circular form and consist of opposed wedge faces which by revolution of the square shaft $v$ upon which they are carried are increased in thickness between the matrix bars and these likewise are assembled by sliding downward upon a square shaft or guide $v^3$ inclined from rear to front downward allowing them to be assembled by gravity. The spacers also are retained by escapements $v^{21}$, $v^{23}$; these escapements for the spaces being also operated by a finger key $v^{29}$; the spaces are re-distributed by hand or by some means actuated generally by the tilting of the top. The spaces and matrix bars are led by the shaft and way wires to the point of assembling and are formed in order before the mouth of the casting box $c$ and when a sufficient number have been assembled for the purpose of the line the handle Q is rotated and the mechanism hereinafter more fully described set in motion for the purpose of obtaining a slug or linotype having the impression of the characters on the matrix bars assembled with the proper spaces for words. In order to insure this result the matrices should be properly lined for which is provided the liner bar $K^4$ and the matrices also are kept under compression during the expansion of the spaces by the compressor bar $s$; the circular wedge spaces $v^{10}$ are rotated to bring their thick portions between the matrices by means of gears $g^6$ and $g^7$ and the whole locked in place. The melting pot $a^3$ which is pivoted at $a^4$ with its nipple $c^3$ is brought into position before the casting box $c$ and by means of a plunger X in the melting pot $a^3$ molten metal is forced out through the nipple $c^3$ so as to fill the casting box and an impression is taken of the characters on the matrix bars $m'$; the melting pot by a reciprocating motion is then removed from the mouth of the casting box, the casting box containing the slug is then shifted by means of the shafts $r^5$ and $d^2$ and connecting fork $b^3$ away from the face of the matrix bars and the shaft $r^5$ is rotated by means of rack $r^2$ and pinion $r^3$ bringing the slug in front of the trimmer knives $n^5$ and the ejector bar $n^9$. The ejector bar is then given a sliding motion by means hereinafter described and passed through the casting box and trimmer knives carrying the slug with it and the slug then falls into the galley $w$ located in the rear of said knives. The top is then thrown back and the matrix bars re-distributed by that motion and the spaces $v^{10}$ are also returned. It is to be noted that the periods of motion of the liner bar compressor bar, expansion of the spacers and the reciprocating motion of the melting pot overlap, and so with the return motion of the melting pot, shifting and revolution of the casting box, which is followed by the trimming and ejection of the slug; these periods are arranged by the proper form given to the various cam faces and grooves and the wedge piece $g^3$.

The two fundamental motions which take place in the operation of the melting pot are, the internal motion of the plunger X which drives the metal out through the nipple and the motion of the melting pot upon the pivot which carries the nipple to the casting box and returns it. This latter motion is caused by the motion of the link $a$ pivoted at $a^{23}$. Link $a$ carries a roller $a^4$ which is located in a cam groove $A^x$ so that when the cam A rotates the links $a$ and $a'$ cause the motion of the melting pot $a^3$ upon the pin $a^4$. This pin $a^4$ turns within the sleeve $a^5$ the sleeve being adjusted by four set screws on either side of the main bracket $b$ which pass through a square bearing $a^6$ thus allowing a means of adjusting for wear. This adjustment in the foot of the melting pot allows the nipple to be brought exactly in line with the mouth of the casting box in the event of any kind of wear. The link $a'$ is also adjustable for wear by means of the turnbuckle $a^7$. Gas is conveyed to the burner $o$ and the gas nipple $o'$ by means of the pipe $o^2$ and the hose $o^3$. The plunger rod $a^8$ (Figs. 1 and 20) attached to a piston X inside the melting pot $a^3$ and cross head $a^9$ and slides $a^{10}$ connected to said rod are operated by means of the cam D outlined in Fig. 3 in dotted lines and which cam D is integral with cams A and B, and said cam D operates the cross head through link $a^{13}$ having a guide roll $a^{22}$ thereon engaging with the said cam D, and lever $a^{11}$. The cross head $a^9$ is secured to the sliding brackets $a^{10}$ by means of tapered machine screws $a^{14}$ which are removable easily and allow of removal of plunger. (See Fig. 20.) The metal pot actuating link $a'$ has a bracket $a^{15}$ extending upwardly therefrom (Figs. 16 and 26) and on the rocking of the pot toward the matrices this bracket allows the spring $a^{21}$ to draw the arm $a^{16}$ of the bell crank $a^{18}$ into the depression between the collar $e'$ on the compressor bar $s$ and the frame $a^{20}$ and prevents the compressor bar being moved longitudinally during the revolution of the spacers. The operation of the compression bar is described hereinafter.

The cam B, which is integral with cam A, operates a sliding shaft $b^2$ to which is attached a fork $b^3$ and it is surrounded by a helical spring $b^4$. The said spring impinges upon the bracket $b^5$ and a collar $b^6$ and tends to push the shaft $b^2$ on the end of which is a roller $b^7$, against the cam B and by means of the fork $b^3$ acting on the shaft $r^5$ gives to the casting box $c$ to which it is attached, a horizontal sliding motion toward and away from the matrices. This sliding motion gives clearance for the movement of the casting box $c$ after casting in carrying the slug to and from the trimmer knife $n^5$ and also carries the box and slug away from the matrices. On the motion of the casting box from the matrices the bracket $a^{15}$ impinges on the projection $a^{17}$ of the bell crank $a^{18}$ and removes the lever $a^{16}$ from interposition between the collar $e'$ on the compressor bar $s$ and the main head $a^{20}$ and thus allows of unlocking the compression maintained upon the line by the compressor bar shaft during casting, the compressor bar cam E giving an upward sliding motion to the compressor bar $s$, by means of the connection $u^2$, $u^6$ and the compressor bar tilting cam $s^2$ giving a rocking motion to the compressor bar $s$ by means of the lever $s^3$ which is thus kept out of the way during redistribution. This action only takes place if the compressor bar has come down far enough and allows the lever $a^{16}$ to enter the space between the frame $a^{20}$ and the collar $e'$ which it will not do in the case of too long a line. This interposition locks the compressor bar in position so that it cannot be drawn up beyond the end of the line by the expansion of the matrices by the spacers.

The nipple face $c'$ of the melting pot is put on by screwing in brass bushings $c^2$ into the face of the nipple head $c^3$ and the face is held on by steel machine screws $c^4$ fastened into the brass bushings $c^2$. This owing to the difference of expansion between the steel and the brass allows of easy removal for cleaning or adjustment.

On the nipple face $c'$ and below the holes $c^5$ is a groove $c^6$ which causes a protuberance of metal upon the slug and this protuberance by remaining on the slug catches in the slot $f'$ of the casting box see Figs. 23 and 24 during trimming of the back, holds the slug firm while the back is trimmed and it also is trimmed off during the operation of trimming. Inside the passage from the melting pot $a^3$ to the nipple exit $c^5$ is a perforated stop or choke $c^9$ known as a hurdle and by arranging the entrance $c^7$ from the melting pot through the hurdle $c^9$ at an angle with the general course of the entrance $a^3$ the metal in passing through the hurdle $c^9$ and emission vents $c^8$ does not spit into the casting box and a more even flow to the letters is arrived at, chiefly by reason of the metal pouring out of the lower part of the holes $c^8$ on the face of the nipple evenly with the upper part.

In order to impart to the square spacer shafts $v$ $v$ a rotary motion to rotate the spaces $v^{10}$ the link lever $a$ also operates the link $g'$ which is adjustable by means of the turnbuckle $g^2$ (see Figs. 3 and 25) and is formed at its end into a double wedge $g^3$. This wedge in its movement operates lever $g^4$ to which is attached weight G and thereby operates the rack $g^5$ which revolves two spacer shaft gears $g^6$ and $g^7$ pivoted in the main frame $a^{20}$ and secured to the shafts $v$ $v$. The forward end of the lever $g^4$ is slotted at $g^9$ to receive the pin $g^{10}$ of the rack $g^5$ and allows of the motion of the rack $g^5$ in a straight line in the main bracket $a^{20}$. The lever $g^4$ has a roller 6 which engages with the wedge.

The arm $h^7$ of the antisplash lever $h'$ pivoted at $h^2$ extends down between two bosses $h^3$ and $h^4$ upon the lever $a^{11}$.

Normally the lever $g^4$ is held up by the highest part of the wedge $g^3$ and said lever engaging the screw $h^5$ on the said lever $h'$ keeps the end $h^7$ in engagement with the boss $h^4$. When the melting pot moves toward the line of matrices, said wedge moves toward the right, Figs. 2 and 25, thus permitting the weight G to move the lever $g^4$ downward and rotate the shafts $v$. After a certain amount of movement of this lever it comes in contact with the screw $h^6$ and moves the end $h^7$ off the boss $h^4$, thus permitting the plunger in the melting pot to operate. If the line is too tight the wedge plates $v^{10}$ become jammed therein so that the weight G cannot rotate the shafts $v$ and thus lever $g^4$ remains in its raised position, even though it is unsupported by the wedge so that the end $h^7$ remains on the boss $h^4$. If the line is too loose, the lever $g^4$ continues to move downwardly on the wedge until it strikes the screw $h^6$, a further movement will throw the end $h^7$ on to the boss $h^3$. If the line is normal, the wedge plates $v^{10}$ become jammed when the line is properly spaced and prevent the movement of lever $g^4$ just as soon as said lever comes in contact with the screw $h^6$ and moves the end $h^7$ off of boss $h^4$.

The antisplash lever $h'$ has a handle $h^8$ secured to the third short arm $h^9$ by means of which the bell crank lever may be rotated on its pivot $h^2$ and so be engaged, or disengaged by hand with either of the bosses $h^3$ or $h^4$. Affixed to the long arm $h^7$ are two helical springs $h^{10}$ and $h^{11}$ which are at their other ends attached to the lever $a^{11}$ and are adjusted so as to tend to keep the prongs of the fork $h'$ in such a position as to admit of proper motion of the weighted arm of the lever $g^4$. This lever $g^4$ is pivoted at a point $g^{11}$.

The liner bar cam groove K, in cam $K^x$ by means of roller guide $k^6$ operates the adjustable sliding link $k'$ with fork $k^2$ which operates the rocking shaft $k^3$ and the liner bar $k^4$ with bearings $k^7$ and $k^8$ in the main frame $a^{20}$. The link $k'$ is adjustable by means of the turnbuckle $k^5$ and there is shown at $m'$ Fig. 14 the matrix in position preparatory to the forward movement of the liner bar which forces the matrix in against the liner pieces $m^2$ and $m^3$. In the matrix stem $m^4$ is a notch at $m^5$ adapted to receive the point of the liner bar $k^4$ and which assists in assuring rigidity of the matrices in position during casting. At the point $m^6$ in the matrix is also a rabbet adapted to closely fit against the face piece $m^7$ of the compressor bar $s$ and which assists in the same purpose. The compressor bar is also shown in section at $s$.

The ejector bar cam groove N in gear O (Fig. 23) operates by means of roller guide $n^{10}$ and link $n'$ bracket $n^8$ and sliding shaft $n^2$ and a fork $n^3$; the ejector bracket $n^4$ being integral with the ejector bar $n^9$. The operation of the cam groove N is to slide the ejector bar $n^9$ to and fro impinging upon the slug within the casting box, $c$ passing through the casting box, and forcing the slug through the trimmer knife $n^5$ the casting box being brought in a position allowing this. The ejector bar $n^9$ is guided in its operation by the tongue $n^6$ working in a groove in a bracket $n^7$. The trimmer knives $n^5$ are carried by plate $n^x$ which is connected to the ejector bracket $n^7$ and with the ejector bracket sleeve $r^6$. The ejector bracket sleeve $r^6$ turns upon the casting box shaft $r^5$. The bracket $n^4$ of the ejector bar $n^9$ fits loosely in the slot $n^{13}$ formed by the fork $n^3$ so as to have longitudinal movement therein to permit the parts $n^7$, $n^5$, and $r^6$ moving on the shaft $r^5$.

Bracket $n^7$ and sleeve $r^6$ are adapted to turn in the main head of the machine $a^{20}$ and said sleeve is grooved to receive the stop screw $r^9$, which keeps the bracket in place and prevents it ordinarily from slipping with the casting box shaft but admits of adjustment. At the back of the bracket $n^7$ is a spring $r^{10}$ which tends to pull the bracket upward on its pivot on the main head at the casting box shaft. In the ordinary working of the machine it is carried downward by the casting box pin $f^6$ impinging on stop $r^8$, but should the box through wear or otherwise not come into place exactly, this arrangement insures that it will still keep in alinement with the ejector bar and the trimmer knife. The casting box shaft is tapered at $r^{14}$ and a threaded nut $r^{15}$ is screwed in between the casting box and the bracket. The casting box is slid on the tapered shaft and retained in place by a nut which engages the threads $r^{16}$. The casting box $c$ has a wing $f^3$, which has a hole $f^4$ therein, which is adapted to engage a stop $f^5$ when the box is slid inwardly against the matrices, whereby said box is locked in position.

The gear O on shaft $Q^6$ which is in mesh with the pinion P integral with handle Q is the means whereby the cams mentioned so far are operated, the pinion P being turned by the handle Q. Operated by the same cam shaft $Q^6$ is the spiral meshing gear $Q^1$, Figs. 1 and 26, which operates a spiral gear (not shown) on the lay shaft $Q^8$. Working in the cam groove $q^1$ in cam 4 on said shaft $Q^3$ is a small guide $q^2$ having a roller surface which gives a reciprocating motion to the rack bar $q^3$ which is adjustable by turnbuckle $q^4$ and has a rack $q^5$ which operates by means of the gear $q^6$ the matrix carrier or top shaft $q^7$ (see Figs. 2, 4, 5 and 26). Fixed to this shaft by two arms $q^8$ is the matrix carrier or top $q^9$ (see Fig. 3) and also affixed thereto are eccentric spring levers $q^{10}$ with arms $q^{11}$ and $q^{12}$ which in operation are thrown on either side of the center of the shaft $q^7$ causing extension of the springs $q^{13}$ and $q^{14}$ alternately, which balance the top whether in a forward or thrown back position. The spring $q^{13}$ is divided into two parts working over rollers $q^{15}$ by means of a chain $q^{16}$ which allows a sufficiently long spring to be used. The springs $q^{14}$ and $q^{13}$ are attached to the levers by pivoted brackets $q^{21}$ and $q^{22}$.

The rack bar $q^3$ is adapted to engage in the groove in the main bracket $q^{18}$ and works upon an eccentric roller pin $q^{19}$ which is kept in position by a thumb screw $q^{20}$ which admits of the rack bar $q^3$ being thrown in and out of engagement with the gear $q^6$. This permits of optional automatic swinging of the top or of swinging it by hand.

The casting box cam groove R operates an adjustable yoked rack bar $r^1$ with turnbuckle $r^{20}$ by means of the guide $r^{17}$ its rack $r^2$ being of sufficient length to operate two pinions $r^3$ and $r^4$. The gear $r^4$ operates the casting box shaft $r^5$ giving to it a rocking motion.

The compressor bar $s$ is rotated by the following means: The pinion $r^3$ operated by the rack bar $r^2$ operates the shaft $s^1$ and on this shaft is the cam face $s^2$ and stop $s^{11}$ and pivoted on the compressor bar $s$ is the lever $s^3$ kept impinging on the cam face $s^2$ by the spring $s^5$ during assembling of the line; after casting the cam $s^2$ by means of lever $s^3$ throws the compressor bar tongue $s^7$ away from the matrix line and allows redistribution. The compressor bar cam U on shaft $Q^3$ operates by means of a roller guide $u^1$ the slotted link bar $u^2$ adjustable by turnbuckle $u^{11}$ have a slide $u^3$ in which is placed a spring $u^4$ intended to keep the roller $u^1$ in its ordinary place, the roller $u^1$ being fitted in the slide $u^3$. In case however, of a tight line when the compressor bar $s$ operated as hereinafter described and its tongue $s^7$ would be forced down on the line of matrices and so strain the machine, the force necessary compresses the spring $u^4$ and allows movement of the roller $u^1$ in the slide without damage. This operating with the anti-splash prevents casting of the line in such a case.

The link bar $u^2$ gives a longitudinal reciprocating movement to the compressor bar $s$ by means of a pivoted lever $u^6$, which has a forked end $u^7$, which engages with the sleeve $u^5$. This sleeve is held to the bar $s$ by means of collars $u^8$ and $u^9$, whereby the bar $s$ may be given its rocking movement.

The operation of the compressor bar is as follows: Assuming the bar is in the position shown in Fig. 16, the matrices $m^4$ slide down their way-wires with their bottom ends above said bar $s$ and occupy the space between the part $a^{20}$ and the arm $s^7$. The bar $s$ is then rotated to bring the slot formed by the bar $m^7$ and the notch in said bar in the position shown in Fig. 14 and to force the matrices against the parts $m^2$ and $m^3$, then the liner bar $k^4$ is operated to lock the matrices $m^4$ with their ends in said recess, then the bar $s$ is moved longitudinally whereby the arm $s^7$ will move the matrices close to each other. Each spacer shaft $v$ has an extension $v^3$ and parallel with said shafts and extensions are arranged a pair of rods $v^4$. The ends of these rods and ends of the extensions $v^3$ are supported by a projection $v^2$ resting on the head $a^{20}$. Upon the extensions $a^3$ a double spacer carrier bracket $v^5$ is mounted, while on the rods $v^4$ is arranged a bracket formed by the parts $v^{11}$ and $v^{13}$, which are secured together by the rod $v^{12}$. Said rods $v^4$ also carry brackets $v^9$, which have their free ends slotted to engage with the shafts $v$ and their extensions $v^3$. Brackets $v^9$ are secured to the parts $v^{11}$ and $v^{13}$ by fingers $v^6$, said fingers being secured to the brackets $v^9$ by the pins $v^8$ and to the parts $v^{11}$ and $v^{13}$ by the pins $v^7$. These brackets $v^9$ return the spacers $v^{10}$ which may have been distributed on the shafts $v$. The bar $v^{12}$ with the parts $v^{11}$ and $v^{13}$ is operated by means of a flexible cord or chain $v^{14}$ working on the sheave $v^{15}$ and attached to the matrix carrier $J$ and hence operated by gravity and the raising of the top. There is a double spacer escapement consisting of a bracket $v^{17}$ pivoted upon the pin $v^{18}$ which is pivoted on the bracket $v^5$. This bracket is kept usually in a raised position by the spring $v^{20}$. When at rest the spacers $v^{10}$ which are above the primary spacer hooks $v^{21}$ and $v^{23}$ are kept in position thereby; the hook $v^{21}$ being fixedly attached to the pin $v^{22}$ which is pivoted in the bracket $v^{17}$ and a similar hook $v^{23}$ for the lower shaft fixedly attached to the pin $v^{24}$ being similarly pivoted in the bracket $v^{17}$ with a spring $v^{26}$ tending to keep the primary hooks in an upright position and thus prevent the spacers from sliding down the shaft.

Fixedly attached to the pin $v^{22}$ on the side of the bracket opposite to the hook $v^{21}$ is an arm $v^{33}$ containing the key shown at $v^{29}$ and fixedly attached to the lower pin $v^{24}$ is an arm $v^{34}$. These two arms $v^{33}$ and $v^{34}$ each having a pin $v^{36}$ upon which is pivoted the link $v^{25}$ insuring that the arm $v^{33}$ shall operate similarly to $v^{34}$. Thus it will be seen that when the key $v^{29}$ is depressed the arms $v^{33}$ and $v^{34}$ are also depressed and as these arms are connected to the hooks $v^{21}$, $v^{23}$, said hooks are also depressed.

In the primary hooks $v^{21}$ and $v^{23}$ are slots $v^{27}$ which engage a pin $v^{30}$ fixed in the secondary hooks $v^{28}$ which is placed at a distance from the center of the pin $v^{22}$ on which the hook $v^{21}$ turns and this operation of the primary hook $v^{21}$ thus operates also the secondary hook $v^{28}$ in a contrary motion and similarly with the lower primary hook $v^{23}$ operates the lower secondary hook $v^{39}$. The escapement for both shafts are therefore operated from the key $v^{29}$. At $v^{31}$ is a set screw which acts as a stop for the escapement and allows adjustment thereof. The set screw $v^{32}$ also allows of adjustment of the motion of the ratchet hooks. The form of hook allows passage upward of the spacers but not down without operation.

The matrix escapement $x$ consists of a bracket $x'$ in which are two sliding forks $x^2$ and $x^3$ the fork at the point $x^4$ being adapted to fit over the matrix guide $x^5$ sufficiently close to prevent passing of the matrices $m'$ down the guide. Each sliding fork $x^2$ and $x^3$ is operated by a pivoted push lever $x^7$ either end of the lever engaging with the head of one of the forks $x^2$ and $x^3$. The helical spring $x^8$ tends to keep the longer and bent fork $x^2$ always close to the guide $x^5$. Through the head of the lever $x^7$ passes an adjustable link or wire $x^9$ which is operated by a pivoted letter key $x^{10}$. This letter key $x^{10}$ pivoted at $x^{11}$ consists of a letter let into the proper face and pressure by the finger upon the proper face gives by means of the other arm $x^{14}$ of the lever a pushing motion to the pivoted lever $x^7$ which raises the fork of $x^2$ sufficiently to allow of one matrix to escape and at the same time lowers the fork of $x^3$ so as to prevent more than one matrix escaping. Removal of the finger allows return of the lever $x^7$ to its original position by the fork $x^4$. For cheapness of construction the bearing of the pin $x^{11}$ of the letter key $x^{10}$ can be stamped out of a continuous piece of sheet metal as shown in Figs. 8, 9 and 10, the two lugs $x^{12}$ and $x^{13}$ being cut and turned upward for the pin to pass through them; the pin holes and the slot $x^{17}$ are cut after the lugs $x^{12}$ and $x^{13}$ are turned and formed so as to retain the strength of the metal while turning $x^{12}$ and $x^{13}$ upward. Lever $x^7$ is adjustable to the link $x^9$ by means of two nuts $x^{15}$ and $x^{16}$. When the slug is pushed through the knives it falls into a slide $w$, which carries it to the galley W.

What I claim as my invention is as follows:—

1. In a linotype machine, the combination with the melting pot, means for tilting the same, a bearing for the pot consisting of a shaft, a sleeve surrounding the shaft and set screws in the frame of the machine having their ends engaging and supporting said sleeve.

2. In a linotype machine, the combination with a melting pot, a plunger therein, a rotary shaft, a cam on said shaft, a rod connected to the plunger, a cross head on the rod, a pair of rods connected to each side of the cross head, and a link connecting said rods with the cam.

3. In a linotype machine, the combination with a melting pot, means for tilting the same, and means for preventing the tilting of said pot when the line is too long or too short.

4. In a linotype machine, means for rotating the spacers comprising a shaft on which the spacers are arranged, a gear secured to said shaft, a rack operating said gear, a weighted two armed lever having one arm connected with said rack, an adjustable double faced wedge engaging with the other arm of said lever, and means for reciprocating said wedge to reciprocate the rack.

5. In a linotype machine, the combination with the shaft, spacers carried thereby, a pinion on the shaft, a rack adapted to engage the pinion, means for reciprocating the rack, a melting pot, a lever adapted to tilt the pot, and means controlled by the reciprocating means for engaging said lever at certain times for preventing tilting of the pot.

6. In a linotype machine, the combination with a cam, of a link operated thereby, a double faced wedge on said link, a weighted lever actuated by said wedge, and a pair of spacer shafts operated by said lever.

7. In a linotype machine, the combination with a double faced wedge, means for reciprocating the same, a weighted lever adapted to be raised and lowered by said wedge, a rack having a pin and slot connection with said weighted lever, spacer shafts, and means thereon engaging with said rack.

8. In a linotype machine, the combination with a double faced wedge, means for reciprocating the same, a weighted lever actuated by said wedge, a rack connected to said weighted lever, spacer shafts, pinions thereon engaging with the rack, a pivoted bell crank lever having a fork on one arm thereof, the prongs of which are adapted to be struck by the movement of the weighted lever, a metal pump, a lever for operating the same, and two bosses on said lever adapted to be engaged by the other arm of the bell crank lever to prevent operation of the pump.

9. In a linotype machine, a metal pump, a lever for operating the same, said lever having bosses thereon, a pivoted bell crank lever having one arm normally engaging with one of the bosses to prevent the operation of the pump and its other end forked, a weighted lever adapted to engage with the said forked end, spacer shafts, means for rotating the same by the movement of the weighted lever, and means for actuating the weighted lever to operate the spacer shafts and bell crank lever.

10. In a linotype machine, the combination with a metal pump, a lever for operating the same, lugs on said lever, a pivoted bell crank lever having one arm adapted to engage with said lugs and its other end forked, set screws in the prongs of said forked end, a weighted lever adapted to engage with said set screws, spacer shafts, means connecting said shafts with the weighted lever, and means for actuating said lever.

11. In a linotype machine, the combination with a metal pump, a lever for operating the same, bosses on said lever, a pivoted bell crank lever having one arm adapted to engage with said bosses and its other arm forked, a weighted lever adapted to engage with the prongs of the fork, spacer shafts, means for connecting said shafts with the weighted lever, a reciprocating wedge engaging with the weighted lever for actuating the same to actuate the spacer shafts and bell crank lever, and means for operating the bell crank lever by hand.

12. In a linotype machine, the combination with a metal pump, a lever for operating the same, bosses on said lever, a bell crank lever having one arm adapted to engage with said bosses, two springs each having one end connected to said bell crank lever and its other end to the metal pump lever, said springs being arranged one on each side of the bosses, the other arm of the bell crank being forked, a weighted lever adapted to engage with the said forked arm, spacer shafts, means for connecting said shafts with the weighted lever, and a reciprocating wedge operating the weighted lever.

13. In a linotype machine, the combination with a pair of spacer shafts, pinions thereon, a reciprocating rack engaging with said pinions, a weighted lever pivoted intermediate its ends, a slot and pin connection between one end of said lever and the rack, a weight on the other end of said lever, a roller carried by the weighted portion of said lever, a reciprocating wedge on which the roller rides, a metal pump, and means operated by the weighted lever for preventing the operation of the metal pump, said means being controlled by the position of the spaces on the spacer shaft.

14. In a linotype machine, a metal pot, a link connected thereto, means for reciprocating the link to tilt the pot, a compressor bar shaft, means for moving the shaft longitudinally to compress the line, means for locking the compressor bar shaft in position, and means carried by the link for actuating said locking means to unlock the bar.

15. In a linotype machine, a metal pot, means for tilting the same comprising a reciprocating link, a compressor bar, means for moving the bar longitudinally, a bracket, a spring for holding the bracket in position to lock the bar against movement, and a projection carried by the link adapted to engage with the bracket to unlock the bar.

16. In a linotype machine, the combination with a metal pot, means for tilting the same comprising a link, a compressor bar, means for moving the same longitudinally, said bar having one of its ends extending beyond the frame of the machine, a collar on said extended end, a bracket, a spring for holding one end of the bracket in the space between said collar and the frame to lock the bar against movement, and a projection on the link adapted to engage with the bracket to unlock the bar.

17. In a linotype machine, the combination with a casting box, a shaft carrying the same, a sliding shaft, a forked lever secured to said shaft and having its forked end engaging the casting shaft, and means for reciprocating the shaft to move the casting box toward and away from the line of type.

18. In a linotype machine, the combination with the casting box, a shaft carrying the same, a sliding shaft, a forked lever connecting the sliding shaft to the casting box shaft, a cam, and a spring for holding the sliding shaft against the cam whereby the casting box will be moved toward and away from the line of type.

19. In a linotype machine, the combination with the casting box, a shaft carrying the same, a sliding shaft connected with the casting box shaft for moving the casting box toward and away from the line of type, a stationary pin engaging with the casting box when the same is in engagement with the line of type to hold the same against rocking movement, and means for rocking the casting box shaft.

20. In a linotype machine, the combination with the casting box, a shaft carrying the same, said shaft having a tapered end with which the casting box engages, means for moving the shaft longitudinally, and means for rocking the shaft.

21. In a linotype machine, the combination with the casting box, a shaft therefor, a sleeve surrounding the shaft, said sleeve being mounted to rotate in the frame of the machine, a set screw for holding the sleeve against longitudinal movement, trimming mechanism connected to the sleeve, and means for moving the casting box shaft relatively to the sleeve.

22. In a linotype machine, the combination with a casting box, a shaft therefor, a sleeve mounted in the frame of the machine and surrounding the shaft, trimmer knives connected with the sleeve, an ejector also connected with the sleeve, means for operating the ejector, and means for moving the shaft in relation to the sleeve.

23. In a linotype machine, the combination with a casting box, a casting box shaft, a sleeve surrounding the shaft and mounted in the frame of the machine, trimmer knives connected with the sleeve, an ejector bracket also connected with the sleeve, an ejector bar reciprocating in said bracket, means for reciprocating the said bar, means for rocking the casting box shaft, and a stop connected with the sleeve and adapted to engage the casting box on the rocking movement of the latter.

24. In a linotype machine, the combination with a casting box, a shaft therefor, means for rocking the shaft, a sleeve mounted to rotate in the frame of the machine and surrounding the shaft, trimmer knives, and ejector means integral with the said sleeve, a stop connected with the sleeve, and a pin on said casting box adapted to engage with the stop.

25. A linotype machine, comprising a casting box, a shaft therefor, means for moving the shaft longitudinally, and means for rocking the shaft, a sleeve surrounding the shaft and mounted to rotate in the frame of the machine, ejector means and trimming means integral with the sleeve, a spring for allowing yielding movement of the sleeve, and a stop connected with the sleeve with which the casting box contacts.

26. In a linotype machine, the combination with the casting box, a shaft therefor, means for giving the shaft rotary and longitudinal movement, a sleeve surrounding the shaft, trimming and ejector mechanism integral with the sleeve, a stop connected with the sleeve with which the casting box contacts, a stationary pin, and a wing on the casting box having a hole therein adapted to engage with the pin when the sliding motion of the shaft brings the box into casting position.

27. In a linotype machine, a casting box, trimming knives, means for moving the casting box opposite the trimming knives, an ejector bar having a tongue, an ejector bracket having a slot engaging said tongue, a reciprocating rod having a forked portion thereon which engages with the portion of the ejector bar, and means for reciprocating the rod to force the slug from the casting box through the knives.

28. In a linotype machine, the combination with a casting box, a shaft therefor, a pinion on the shaft, trimming knives, ejector means for forcing the slug from the casting box through the knives, a rack engaging with the pinion for rocking the casting box to bring the same before the knives, means for reciprocating the rack, a compressor bar, and means for rocking the same including a shaft having a pinion thereon, said pinion engaging with the rack.

29. In a linotype machine, the combination with a compressor bar, means for rocking the same to bring the type in proper position comprising a lever secured to the end of the compressor bar, a cam engaging with said lever to rock the bar, a shaft carrying the cam, a pinion on said shaft, and a reciprocating rack engaging with the pinion.

30. In a linotype machine, the combination with a compressor bar, means for rocking the same to position the type and means for moving the bar longitudinally to compress the line, said means including a collar on the end of said bar, a forked link engaging said collar, and means for oscillating the link.

31. In a linotype machine, the combination with the compressor bar, a link connected to one end of the same, means for oscillating the link for reciprocating the bar, said means comprising a cam, a bar connected with the link, a sliding block carried by said bar and having a roller thereon engaging with the cam, and a spring normally holding the block against movement.

32. In a linotype machine, a rocking matrix carrier shaft, a pinion thereon, a rack bar, means for throwing said rack bar into and out of engagement with said pinion, and means for reciprocating the rack bar to rock the matrix carrier shaft.

33. In a linotype machine, the combination with a matrix carrier shaft, of a pinion on said shaft, a rack bar adapted to engage with said pinion, a pin having part of its circumference eccentric to its center, said eccentric part forming a rest for the rack bar and means for turning the pin to throw the rack bar into and out of engagement with the pinion to rock the matrix carrier shaft.

34. In a linotype machine, the combination with a rotary shaft, a cam thereon, means for rotating the shaft, a rack bar operated by said cam, a matrix carrier shaft having a pinion adapted to be engaged by said rack, a forked bracket forming a support for the rack, a pin in said bracket having an eccentric portion engaging with the rack to move the same into and out of engagement with the pinion, and a set screw in the bracket adapted to hold the pin in position to keep the rack bar in engagement with the pinion.

35. In a linotype machine, the combination with a matrix carrier shaft, a matrix carrier secured thereto, a pinion on said shaft, a reciprocating rack, means for throwing said rack into and out of engagement with the pinion and means for operating the matrix carrier by hand when the rack bar is out of engagement with the pinion.

36. In a linotype machine, the combination with a matrix carrier, of a shaft secured to said carrier, means for actuating the shaft to operate the carrier, a double armed eccentric lever attached to said shaft, and springs attached to said lever for holding the shaft with the carrier at the end of its movement in either direction.

37. In a linotype machine, the combination with a matrix carrier, of a shaft upon which it is pivoted, a double armed eccentric lever, and helical springs attached to the several arms.

38. In a linotype machine, the combination with a matrix carrier, a shaft therefor having a pinion thereon, a rack bar engaging with the pinion, means for reciprocating the rack bar, a double armed eccentric lever connected with the shaft having the arms at right angles, and helical springs attached to the extremities of the arms.

39. In a linotype machine, the combination with a matrix carrier, a shaft therefor, means for rocking the shaft, a double armed eccentric lever secured to the shaft, said arms extending at right angles, helical springs attached to the extremities of said arms, said springs being divided, sheaves carried by the frame of the machine, and a flexible cord running over said sheaves and connecting the divided springs.

40. In a linotype machine, the combination with means for assembling a line of matrices, of a pair of spacer shafts arranged vertically one above the other and adapted to receive wedge shaped spacers, means for rotating the spacer shafts, guides arranged parallel to the shafts and spacer slides operating on said guides.

41. In a linotype machine, the combination with means for assembling a line of matrices, spacer shafts located adjacent the assembled line and adapted to receive wedge shaped spacers, means for rotating said spacer shafts, said shafts having extensions, guides arranged parallel to the said shafts and extensions, and means sliding on said guides for returning the spacers.

42. In a linotype machine, means for assembling a line of matrices, a pair of spacer shafts, located one above the other adjacent said line, said shafts having extensions and being adapted to receive wedge shaped spacers, guides arranged parallel with said shafts and their extensions, sliding brackets, sliding in said guides for returning the spacers, and a spacer carrier arranged on the extensions of the shafts.

43. In a linotype machine, the combination with means for assembling a line of matrices, a pair of spacer shafts located one above the other adjacent the said line, means for rotating said shafts, said shafts having extensions and said shafts being adapted to receive wedge shaped spacers, guides arranged parallel to said shafts and their extensions, brackets sliding in said guides and having their ends notched to engage with the spacer shafts, and means for moving the slides to bring the spacer on to the extensions.

44. In a linotype machine, the combination with means for assembling a line of matrices, a pair of spacer shafts arranged one above the other adjacent the said line, means for rotating said shafts, said shafts having extensions, a spacer carrier carried by said extensions, means on said carrier for releasing the spacers one by one, guides arranged parallel to the spacer shafts and their extensions, and sliding brackets on said guides adapted to receive the spacers from the carrier.

45. In a linotype machine, means for assembling a line of matrices, a pair of spacer shafts arranged one above the other adjacent to said line, said shafts having extensions, a spacer carrier on said extensions, means for releasing the spacer from said carrier, guides arranged parallel to said shafts and their extensions, a bracket $v^9$ arranged on each guide, said bracket having one end notched to engage the spacer shaft, a movable member on said guides above the brackets, a finger for pivotally securing each of said brackets $v^9$ to said movable member, and means for moving said member.

46. In a linotype machine, the combination with means for assembling a line of type, means for feeding spacers to said line and a carrier for said spacers, said carrier comprising a stationary bracket, a forked member pivoted thereto, ratchet arms pivoted on said member, and means for operating said arms to release the spacers one by one.

47. In a linotype machine, means for assembling a line of matrices, means for feeding spacers to said line, and a carrier for said spacers, said carrier comprising a bracket, a member pivoted to said bracket, a ratchet arm pivoted intermediate its length on said member, and having a notch at its inner end, a second arm pivoted at one end to the member and having a pin intermediate its end engaging with the notched end in the other arm and a key for depressing the first arm.

48. In a linotype machine, the combination with means for assembling a line of matrices, spacer shafts located adjacent thereto, a carrier arranged on the shaft, said carrier comprising a bracket, a member pivoted thereto, a spring for yieldingly holding the member in raised position, ratchet arms for engaging the spacers when the member is in raised position, means for operating the ratchet arms to release the spacers one by one, and an adjustable stop for limiting the upward movement of the member.

In witness whereof I have hereunto set my hand in presence of two witnesses.

JAMES BENJAMIN ALLEN.

Witnesses:
 MAUDE ADAMS,
 JOHN L. MURPHY.